Figure 1:
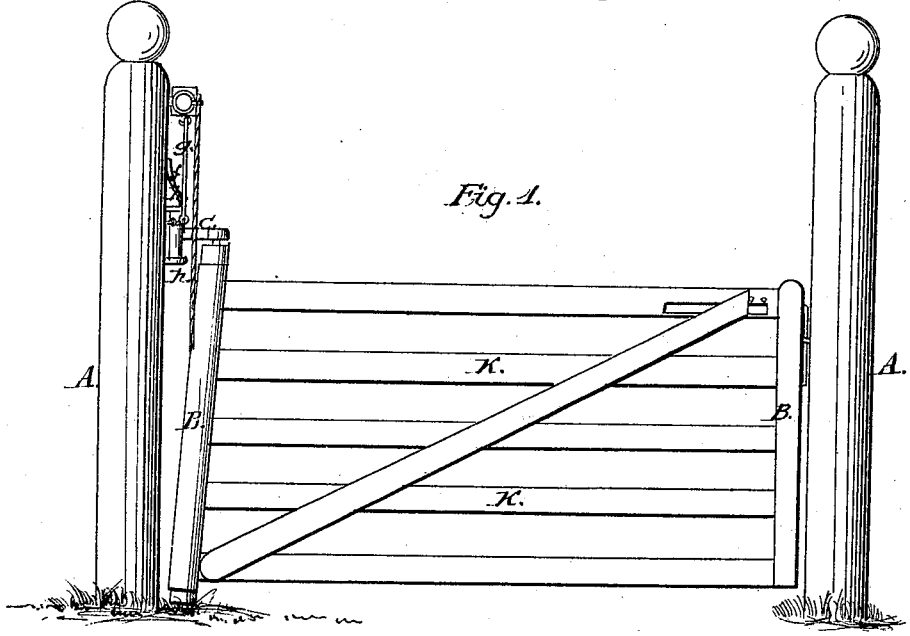
Figure 2:
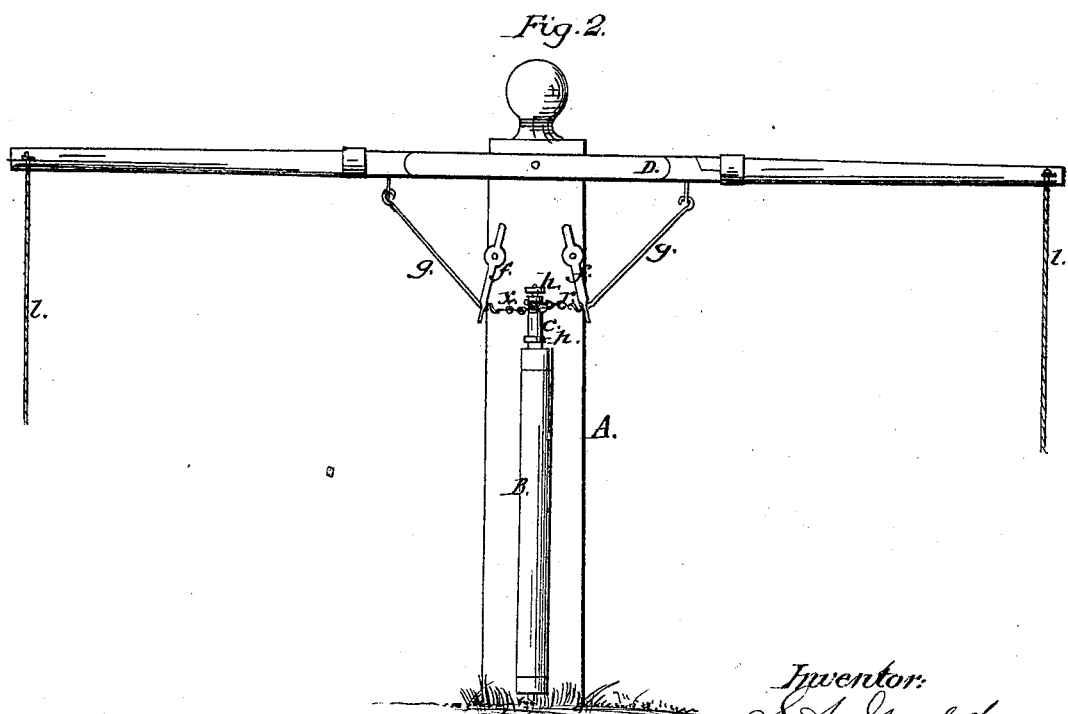

S. A. Gould,
Gate.

No. 87,040. Patented Feb. 16, 1869.

Witnesses:
Wm Wensleben
V. D. Storkbridge

Inventor:
S. A. Gould.
per
Alexander F Mason
Atty

SAMUEL A. GOULD, OF ABERDEEN, INDIANA.

Letters Patent No. 87,040, dated February 16, 1869.

IMPROVEMENT IN GATE.

The Schedule referred to in these Letters Patent and making part of the same.

*To all whom it may concern:*

Be it known that I, SAMUEL A. GOULD, of Aberdeen, in the county of Ohio, and in the State of Indiana, have invented certain new and useful Improvements in Gates; and do hereby declare that the following is a full, clear, and exact description thereof, reference being had to the accompanying drawings, and the letters of reference marked thereon.

In the annexed drawings, making a part of this specification—

A A represent ordinary gate-posts, of any suitable dimensions, and at the required distance apart, planted in the ground.

B,B represent the uprights, and K K, the slats composing an ordinary gate.

One of the uprights B is provided with bolts, or pins, projecting from the ends thereof, the lower one working in a suitable bearing, and the upper one having its bearing in the swinging end of the T-shaped arm, or hinge, C.

The T-shaped arm, or hinge C, is attached to one of the posts A, by means of staples, or ears *h h*, driven into said post, or hinged thereto in any suitable manner.

D represents an arm or lever, pivoted to the post A, in or through its middle, and has cords, or ropes *l l*, fastened to the opposite ends thereof, by which to draw down and operate said lever.

*f f* represent rods or arms, pivoted to the post A, as shown, the lower ends of which pass through loops or holes in the rods *g g*, and hold them down in proper place. Said rods *g g* are attached to the lever D at one end, and to the chain *r* at the other, as shown.

The small chain *r* is wound once around the shank or vertical part of the hinged arm C, and attached to the lower ends of the rods *g g*.

It will readily be seen that by elevating or depressing one end of the lever D, the arm *g* will draw on the chain *r*, and thereby turn the swinging arm or hinge C, which in turn elevates the front end of the gate, and detaches it from its latch, or fastening, when said gate is thrown or forced open.

To shut the gate, or throw it open on the other side, the opposite end of the lever D is elevated or depressed, as above described.

The chain *r* may be operated by arms, if found desirable.

Having thus fully described my invention,

What I claim as new, and desire to secure by Letters Patent, is—

The T-shaped swinging arm, when operated by means of a chain, *r*, and rods *g g*, attached to the lever D, and attached to and forming the upper hinge of a gate, the several parts being arranged as and for the purposes specified.

In testimony that I claim the foregoing, I have hereunto set my hand, this 16th day of February, 1868.

S. A. GOULD.

Witnesses:
    J. H. PEYTON,
    L. W. SUTTON.